US012596632B2

(12) United States Patent
Huth et al.

(10) Patent No.: US 12,596,632 B2
(45) Date of Patent: Apr. 7, 2026

(54) METHOD FOR TESTING A COMPUTER PROGRAM

(71) Applicant: Robert Bosch GmbH, Stuttgart (DE)

(72) Inventors: Christopher Huth, Heilbronn (DE); Max Camillo Eisele, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 215 days.

(21) Appl. No.: 18/399,020

(22) Filed: Dec. 28, 2023

(65) Prior Publication Data

US 2024/0289257 A1    Aug. 29, 2024

(30) Foreign Application Priority Data

Feb. 28, 2023    (DE) ..................... 10 2023 201 815.2

(51) Int. Cl.
G06F 9/44        (2018.01)
G06F 11/362     (2025.01)

(52) U.S. Cl.
CPC ................................. G06F 11/364 (2013.01)

(58) Field of Classification Search
None
See application file for complete search history.

(56) References Cited

U.S. PATENT DOCUMENTS

| | | | | |
|---|---|---|---|---|
| 5,611,043 A | * | 3/1997 | Even ...................... | G06F 11/362 |
| | | | | 714/E11.21 |
| 2018/0181480 A1 | * | 6/2018 | Dracea ................ | G06F 11/3624 |

FOREIGN PATENT DOCUMENTS

| | | | | | |
|---|---|---|---|---|---|
| EP | | 0591753 A2 | * | 4/1994 | ........... G06F 9/3858 |

* cited by examiner

*Primary Examiner* — Insun Kang

(74) *Attorney, Agent, or Firm* — NORTON ROSE FULBRIGHT US LLP

(57)                ABSTRACT

A method for testing a computer program. The method includes executing the computer program until a subprogram is called, ascertaining a memory location of the call stack in which the return address or the stack base pointer of the called subprogram is stored, setting a watchpoint on the ascertained memory location, setting breakpoints on return instructions of the called subprogram, continuing the execution of the computer program and indicating that the computer program has an error if the set watchpoint has been triggered before one of the set breakpoints due to a write to the memory location.

10 Claims, 1 Drawing Sheet

*200*

| execute computer program being tested | *201* |

| ascertain memory location of call stack | *202* |

| set watchpoint | *203* |

| set breakpoints | *204* |

| continue execution of computer program | *205* |

METHOD FOR TESTING A COMPUTER PROGRAM

CROSS REFERENCE

The present application claims the benefit under 35 U.S.C. § 119 of German Patent Application No. DE 10 2023 201 815.2 filed on Feb. 28, 2023, which is expressly incorporated herein by reference in its entirety.

FIELD

The present disclosure relates to methods for testing a computer program.

BACKGROUND INFORMATION

Testing is an essential component of the development of software applications and, if errors are found, appropriate error correction. In particular errors that lead to failure of an application should be identified and corrected. An important aspect is testing to ensure that important memory areas are not accessed unintentionally (or by an attacker), i.e., testing with memory monitoring as carried out by a so-called (memory) sanitizer. Compiling and testing software on common desktop and server hardware, e.g. x86, with the aid of various sanitizers is a measure against which errors such as the heartbleed bug, which had previously remained undetected for a long time, can be discovered.

Comprehensive testing that also includes such memory monitoring is particularly important for computer programs on embedded systems, such as control devices for a vehicle, which are often relevant to safety. However, sanitizers that are used for desktop and server hardware cannot be used or can only be used poorly for such systems, because embedded systems typically have limited resources and such sanitizers require significant resources and can therefore not be used or may even affect the execution of the computer program in such a way that it actually causes an error.

Methods for testing computer programs that enable memory monitoring and are suitable for embedded systems are therefore desirable.

SUMMARY

A method for testing a computer program is provided according to various embodiments of the present invention, which comprises executing the computer program until a subprogram is called, ascertaining a memory location of a call stack in which a return address or a stack base pointer of the called subprogram is stored, setting a watchpoint on the ascertained memory location, setting breakpoints on return instructions of the called subprogram, continuing the execution of the computer program and indicating that the computer program has an error if the set watchpoint has been triggered before one of the set breakpoints due to a write to the memory location.

The above-described method enables testing with memory monitoring (i.e., with a sanitizer) on an embedded system using a debugger. This is particularly suitable for testing with fuzzing, because fuzzing can also be implemented in a debugger-controlled manner and can thus be used effectively for embedded systems.

Sanitizers can be implemented using code instrumentation. However, this either requires the source code to be available or requires instruction set-specific instrumentation based on the binary file (binary instrumentation), which is very vulnerable. Alternative emulator-based instrumentation is also very platform specific, and each embedded platform requires its own emulator. The above-described method enables testing with a debugger-controlled sanitizer and does not require instrumentation or emulation and can therefore be used in many cases.

It should be noted that the above can be carried out for both the return address and the stack base pointer, i.e., both memory locations can be monitored in the above manner for calling a subprogram.

Various embodiment examples are specified in the following.

Embodiment example 1 is a method for testing a computer program as described above.

Embodiment example 2 is a method according to embodiment example 1, comprising ascertaining the memory location by stopping the execution of the computer program at an instruction for calling the subprogram and incrementally executing machine commands that implement the instruction for calling the subprogram until a machine command that stores the return address or the stack base pointer is reached and ascertaining the memory location from the machine command.

Calling the subprogram typically involves multiple machine commands. These are executed one after the other until the command that stores the return address or the stack base pointer is reached. The memory location can then be ascertained from the command. Execution can be stopped by setting a breakpoint on the instruction for calling.

Embodiment example 3 is a method according to embodiment example 1 or 2, comprising executing the computer program on an embedded system and setting the watchpoint and the breakpoints by means of a test system connected to the embedded system.

According to various embodiments, testing of a computer program for an embedded system is in particular enabled on the embedded system itself and includes memory monitoring.

Embodiment example 4 is a method according to any one of embodiment examples 1 to 3, comprising selecting a set of subprograms and for each subprogram of the selected set: executing the computer program until the subprogram is called, ascertaining a memory location of the call stack in which the return address or the stack base pointer of the called subprogram is stored, setting a watchpoint on the ascertained memory location, setting breakpoints on return instructions of the called subprogram, continuing the execution of the computer program and indicating that the computer program has an error if the set watchpoint has been triggered before one of the set breakpoints due to a write to the memory location.

A set of subprograms can thus be monitored for possible overwriting of their return address or their stack base pointer. For example, the selected set is the subprograms (or at least part thereof) that are called in another ("superordinate") subprogram.

Embodiment example 5 is a method according to embodiment example 4, comprising setting breakpoints on the subprograms of the selected set of subprograms.

This automatically stops the execution when a subprogram is called, so that the memory location of the call stack in which the return address or the stack base pointer of the called subprogram is stored can then easily be ascertained.

Embodiment example 6 is a method according to any one of embodiment examples 1 to 5, comprising testing the computer program (e.g. on an embedded system) by means of fuzzing with a plurality of test cases (e.g. using a test system), wherein each test case specifies a respective set of subprograms and for each subprogram comprises the set specified for the test case: executing the computer program until the subprogram is called, ascertaining a memory location of the call stack in which the return address or the stack base pointer of the called subprogram is stored, setting a watchpoint on the ascertained memory location, setting breakpoints on return instructions of the called subprogram, continuing the execution of the computer program and indicating that the computer program has an error if the set watchpoint has been triggered before one of the set breakpoints due to a write to the memory location.

Memory monitoring can thus be part of a fuzz test, in which case the fuzzer can select the subprograms that are monitored. Errors regarding overwriting of a return address or the stack base pointer can thus be found for many different inputs of the computer program and subprograms of the computer program, even if only a certain number of breakpoints and watchpoints are available on the (e.g. embedded) system on which the computer program is being executed.

Embodiment example 7 is a method according to any one of embodiment examples 1 to 6, comprising deleting the watchpoint when one of the set breakpoints is triggered.

The watchpoint can then only be triggered before one of the breakpoints is triggered and said triggering can therefore be interpreted as an error without further checking.

Embodiment example 8 is a method according to any one of embodiment examples 1 to 7, wherein the computer program is a control program for a robot device and the robot device is controlled with the computer program based on a result of testing the computer program.

In other words, a method for controlling a robot device can be provided, in which security against overwriting of return addresses and/or stack base pointers is ensured by testing using a sanitizer.

Embodiment example 9 is a test arrangement, which is configured to carry out a method according to any one of embodiment examples 1 to 8.

Embodiment example 10 is a computer program comprising instructions that, when executed by a processor, cause said processor to carry out a method according to any one of embodiment examples 1 to 8.

Embodiment example 11 is a computer-readable medium which stores instructions that, when executed by a processor, cause said processor to carry out a method according to any one of embodiment examples 1 to 8.

In the figures, like reference signs generally refer to the same parts throughout the different views. The figures are not necessarily to scale, wherein emphasis is instead generally placed on representing the principles of the present invention. In the following description, various aspects of the present invention are described with reference to the figures.

DETAILED DESCRIPTION OF EXAMPLE EMBODIMENTS

The following detailed description relates to the accompanying drawings, which, for clarification, show specific details and aspects of this disclosure in which the present invention can be implemented. Other aspects can be used, and structural, logical, and electrical changes can be carried out without departing from the scope of protection of the present invention. The various aspects of this disclosure are not necessarily mutually exclusive since some aspects of this disclosure can be combined with one or more other aspects of this disclosure to form new aspects.

Different examples will be described in more detail in the following.

Figure 1:
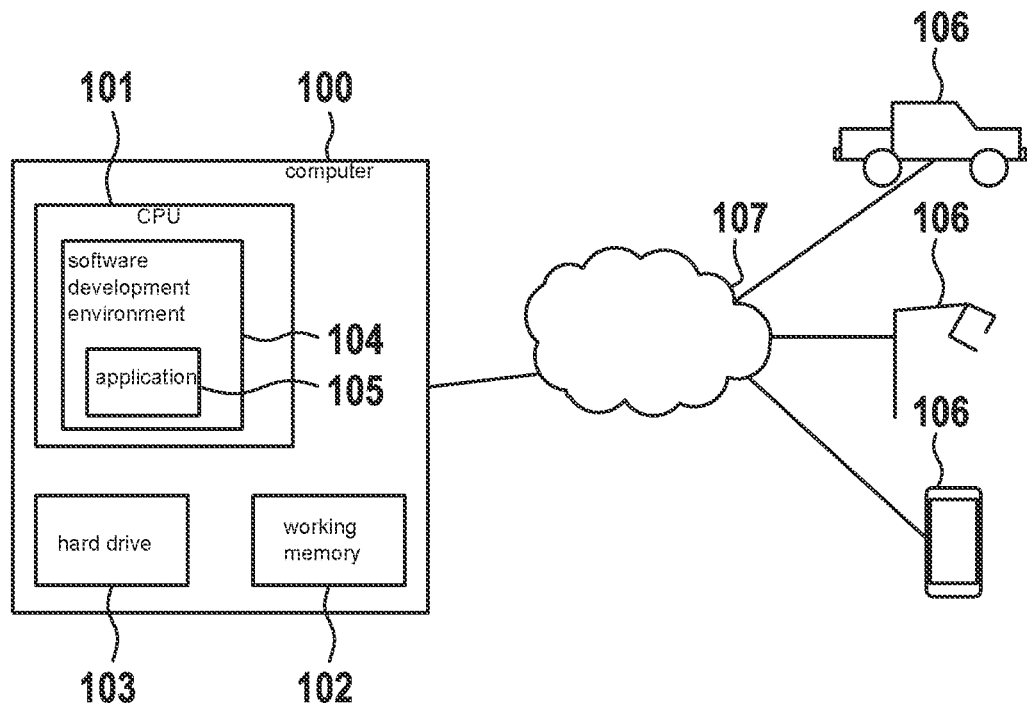
FIG. 1 shows a computer for developing and/or testing software applications, according to an example embodiment of the present invention.

FIG. 1 shows a computer 100 for developing and/or testing software applications.

The computer 100 comprises a CPU (central processing unit) 101 and a working memory (RAM) 102. The working memory 102 is used to load program code, e.g. from a hard drive 103, and the CPU 101 executes the program code.

This example assumes that a user intends to use the computer 100 to develop and/or test a software application.

To do so, the user executes a software development environment 104 on the CPU 101.

The software development environment 104 enables the user to develop and test an application 105 for different devices 106, i.e. target hardware, such as embedded systems for controlling robot devices, including robot arms and autonomous vehicles, or also for mobile (communication) devices. For this purpose the CPU 101 can execute an emulator as part of the software development environment 104 to simulate the behavior of the respective device 106 for which an application is being or has been developed. If it is used only to test software from another source, the software development environment 104 can also be considered or configured as a software test environment.

The user can distribute the finished application to corresponding devices 106 via a communication network 107. Instead of a communication network 107, this can also be done in other ways, for example using a USB stick.

Before this happens, however, the user should test the application 105 to avoid distributing an improperly functioning application to the devices 106.

One test method is so-called fuzzing. Fuzzing or fuzz testing is an automated software testing procedure in which invalid, unexpected or random data are fed as inputs to a computer program being tested. The program is then monitored for exceptions such as crashes, missing failed built-in code assertions or potential memory leaks.

Fuzzers (i.e. test programs that use fuzzing) are typically used to test programs that process structured inputs. This structure is specified in a file format or a file format or protocol, for example, and distinguishes between valid and invalid inputs. An effective fuzzer produces semi-valid inputs that are "valid enough" to not be directly rejected by the input parser of the program being tested, but are "invalid enough" to reveal unexpected behaviors and edge cases that are not being handled properly in the program being tested.

The following describes terminology used in the context of fuzzing:

Fuzzing or fuzz testing is the automated testing process of sending randomly generated inputs to a target program (program being tested) and observing its response.

A fuzzer or fuzzing engine is a program that automatically generates inputs. It is therefore not linked to the software being tested and no instrumentation is carried out. However, it has the ability to instrument code, generate test cases and execute programs being tested. Examples are afl and libfuzzer.

A fuzz target is a software program or function to be tested by means of fuzzing. A key feature of a fuzz target should be that it accepts potentially untrustworthy inputs generated by the fuzzer during the fuzzing process.

A fuzz test is the combined version of a fuzzer and a fuzz target. A fuzz target can then be instrumented code in which a fuzzer is linked to its inputs (i.e. provides said inputs). A fuzz test is executable. A fuzzer can also start, observe, and stop multiple fuzz tests (typically hundreds or thousands per second), each with a slightly different input generated by the fuzzer.

A test case is a specific input and test run from a fuzz test. Runs that are interesting for reproducibility (finding new code paths or crashes) are typically stored. A specific test case with the corresponding input can thus also be executed on a fuzz target that is not connected to a fuzzer, e.g. the release version of a program.

Coverage-guided fuzzing uses code coverage information as feedback during fuzzing to detect whether an input has caused the execution of new code paths or blocks.

Generation-based fuzzing uses previous knowledge about the target program (fuzz target) to create test inputs. An example of such prior knowledge is a grammar that corresponds to the input specification of the fuzz target, i.e. the input grammar of the fuzz target (i.e. the program being tested).

Static instrumentation is the insertion of instructions into a program (being tested) to obtain feedback on the execution. This is usually carried out by the compiler and can, for example, indicate the code blocks reached during execution.

Dynamic instrumentation is the control of the execution of a program (being tested) during runtime to generate feedback from the execution. This is usually carried out by means of operating system system functionalities or by the use of emulators.

A debugger is a device or program that can control a target device or target program and provide functions, e.g. for retrieving register or memory values and for pausing and executing the target program in individual steps.

A breakpoint is set via a debugger in response to an instruction of the target program or device to stop execution when said breakpoint is reached and inform the controlling process of this.

A data watchpoint is set via a debugger on a memory address of a target program or target device to stop execution when the memory address is accessed and inform the controlling process of this by triggering an interrupt.

Embedded systems typically comprise a microcontroller that processes the inputs and responds with outputs in order to accomplish a specific task. Even though microcontrollers use the same memory model and are programmed with the same programming languages as ordinary user programs, their programs are much more difficult to test. To enable debugging, microcontrollers usually provide the ability to interrupt the program with breakpoints, run through the program's instructions in individual steps and set watchpoints on memory addresses. Watchpoints trigger an interrupt when the corresponding memory areas are accessed. Hardware breakpoints and watchpoints are typically implemented as physical registers in the debug unit of a microcontroller; therefore their number is limited and depends on the respective system. The maximum number for a typical microcontroller is four breakpoints and two data watchpoints, for instance. Watchpoints can usually distinguish between read and write accesses.

Breakpoints and watchpoints can in particular be used to realize debugger-controlled fuzzing, so that no instrumentation is required.

Fuzzing, also debugger-controlled fuzzing, is very efficient at finding errors that trigger observable behavior, such as a crash or restart. However, entire classes of errors cannot be observed, because the program fails silently when these occur. One example is the heartbleed bug. The essence of the heartbleed bug was that it only reads beyond the boundary of an array, whereas a write operation would have caused an easily observable segmentation error.

The heartbleed bug was only found with help from the Address Sanitizer (ASan). ASan inserts additional instructions, metadata and checks during the compilation of a program to prevent memory corruption errors. When such sanitizer instructions are available in a program, more errors can be found when debugging the program than without a sanitizer. In particular automated tests, such as fuzzing, shine when a sanitizer is provided in the program being tested (i.e. in the fuzz target) to reveal additional errors.

For embedded systems, such as a data processing device with an ARM architecture, such sanitizers are not as easy to use as for standard platforms, such as x86 platforms. There are several reasons for this:

An embedded system is too resource-constrained to implement a sanitizer. For example, Asan requires twice the memory, MSan (MemorySanitizer) requires 2.5 times the resources, and UBSan (UndefinedBehaviorSanitizer) even requires three times the working memory of the program.

Sanitizers increase the size of the compiled binary file. In the automotive industry, the size of such binary files is typically close to the available flash memory of the target hardware. Additional instrumentation of a sanitizer would therefore not fit into the flash memory.

Due to the additional instrumentation of sanitizers and the collection and tracking of metadata, the use of a sanitizer results in a slower runtime of a binary program on the respective hardware. Embedded systems are highly dependent on asynchronous events, such as interrupts, and therefore sanitizers can lead to time-based false positive errors, i.e. a sanitizer can introduce new errors during the runtime.

Embedded systems typically do not have a user interface for displaying runtime errors. On x86-Systemen, for example, a segmentation error is forwarded to STDERR, so that the user sees the crash. Embedded systems, on the other hand, fail silently, i.e. without the user noticing, and restart after such a crash.

Therefore, an approach is provided according to various embodiments that enables the use of memory monitoring (i.e. a sanitizer functionality) for an embedded system, in particular such that the memory monitoring can be used for debugger-controlled fuzzing. The memory monitoring itself is made possible with the aid of a debugger (or the debugger used for the fuzzing).

In debugger-based fuzzing, interactions between the system carrying out the test (e.g. corresponding to the computer 100) and the target system (target hardware, e.g. an embedded system, for instance a target device 106) occur via a debug connection (i.e. debug interface) that is provided, for example, by a dedicated debugger hardware device. The test input data is transmitted in the form of an input vector, e.g. via WiFi or a CAN bus (depending on the type of target device 106) to the target system 106; i.e. in this test the communication network 107 is such a debug connection (when the tested software is distributed, the communication network can then be any other communication network). The system that carries out the test, hereinafter also referred to as the test system 100, controls the execution of the target program (i.e. the program being tested) in the target system via the debug connection; i.e. starts the execution and resumes the execution after an interrupt (in particular an interrupt triggered by a data watchpoint).

A debugger-controlled sanitizer does not require instrumentation or emulation, only a debug interface to the target system (e.g. an embedded system on which the software is being executed) with the ability to set breakpoints and watchpoints. These types of debug interfaces and capabilities are generic and widely available, which leads to a broad and easy applicability of the approach described in the following. There is moreover only a small load on the memory of the target system, e.g. for metadata, because most of the sanitizer-related information is collected and stored on the host side of the debugger (i.e. in the testing system 100). The size of the compiled binary file of the target program is not increased because it can be used for testing as it is intended for use on the target system 106.

A debugger stops the target system when a breakpoint is reached. Therefore, the approach described in the following only leads to time-based false alarms in rare cases. These false alarms can also be excluded using other test techniques, e.g. by subsequently validating a detected error on the target system. The use of a debugger also provides good insight into the internals of a target system.

The approach described in the following is used for memory monitoring, i.e. the detection of unwanted writing or reading of memory areas by a program being tested. Computer programs consist of instructions that act on the memory. To avoid unintentional concurrent use of memory spaces, the memory is usually divided into different areas, namely stack, heap, and static memory.

The stack (which here means the call stack or procedure stack) is a continuously growing memory area that provides subprograms space for their local variables. Each function is given its own memory area on the stack. Stack memory is allocated by decreasing the stack pointer (continuous memory). Stack frames for called functions are allocated by decreasing the stack base pointer and the stack pointer.

In C, for example, a memory area of the heap memory is allocated with the required memory size by calling the malloc, realloc or calloc functions and the allocated memory area is released again with the free function and can be reused in a subsequent allocation request. Memory areas of the heap memory are typically used for long-lasting variables that are shared by various functions.

For correct program executions, it is important that the limits of the allocated memory are not exceeded. Ensuring correct memory accesses in memory-unsafe languages such as C, C++ is the responsibility of the programmer. Neglecting the limits of the allocated memory can lead to serious security incidents, e.g. the execution of remote code or data leaks.

According to one embodiment example, a watchpoint is used to detect stack overflows, in particular the dangerous overwriting of the return address of a subprogram (function, method or procedure), in order to monitor the corresponding memory location, i.e. the memory location of the stack that is storing the return address. In the following, watchpoint refers to a write watchpoint, i.e. a watchpoint that is triggered when writing to a memory location (but not necessarily when reading), because the intent is to detect overwriting. It is, however, also possible to use a watchpoint that is triggered when writing and reading and, when it is triggered, check whether a write was actually the reason. A memory location stores a word with a word length depending on the particular architecture (e.g. 32 bits) and is identified by a respective address.

The following assumes that the test system 100 (possibly corresponding to a user input) selects one or more subprograms from which all of the subsequent methods are protected. For each selected subprogram, the test system 100 carries out the following:
1. Setting breakpoints on all (or a selected part) of the subprogram call instructions in the selected subprogram
2. Starting the selected subprogram
3. In the event of an interruption (due to one of the set breakpoints), advancing incrementally until the current stack frame (i.e. the stack frame for the call the breakpoint of which anticipated the interruption) is stored on the stack (this can be done by the calling subprogram or the called subprogram, depending on the architectural convention)
4. Setting a write watchpoint on the stored return address (i.e. the return address closest to the current stack boundary)
5. Setting a breakpoint on each return instruction of the called subprogram
6. If the write watchpoint is triggered before a return instruction of the called subprogram is reached, unwanted overwriting of the return address has occurred. In this case, therefore, the test system 100 indicates that an error has occurred, which in turn can trigger the execution of a security measure.

Alternatively, if no watchpoints are available (for example because only a limited number are available and they have already been used for other return addresses), the stored return address can also be checked prior to reaching a return instruction. Since the number of breakpoints and watchpoints on an embedded system can be limited, it may not be possible to test all of the called subprograms in the above-described manner. If this is the case, the subset of the subprogram calls being tested is either selected randomly, for instance, or the subprogram calls are tested one after the other in multiple runs of the target program.

In addition, not only the return address can be protected in this way, but, for instance, also the stack base pointer (Stack BasePointer) of the called subprogram. This is likewise stored on the stack. Table 1 shows the typical structure of a stack frame for a called subprogram. Each line symbolizes a memory location.

TABLE 1

| ... | |
|---|---|
| Previous stack frame | |
| Subprogram call parameter | |
| Return address | <– a watchpoint is set on this |
| Stack base pointer | <– Alternatively or additionally a watchpoint is set on this |
| Local variables | <– The stack base pointer points to this |
| Local variables | |
| Local variables | <– The stack pointer points to this (end of stack) |
| ... | |

Figure 2:
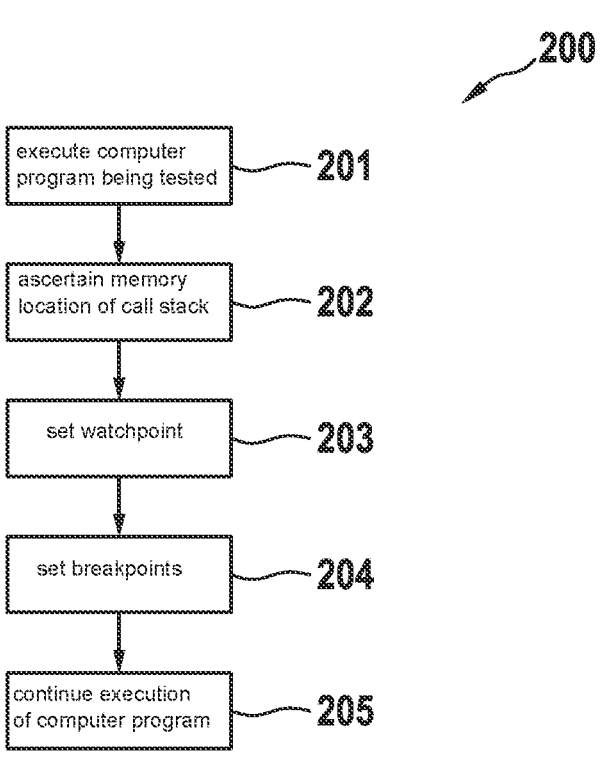
FIG. 2 shows a flowchart illustrating a method for testing a computer program according to an example embodiment of the present invention.

In summary, a method is provided according to various embodiments as shown in FIG. 2.

FIG. 2 shows a flowchart 200 illustrating a method for testing a computer program according to an embodiment.

In 201, the computer program (being tested) is executed until a subprogram is called.

In 202, a memory location of the call stack is ascertained (e.g. the corresponding address in the memory of the system that is executing the computer program) in which the return address or the stack base pointer of the called subprogram is stored.

In 203, a watchpoint is set on the ascertained memory location.

In 204, breakpoints are set on return instructions of the called subprogram.

In 205, the execution of the computer program is continued and there is an indication that the computer program has an error if the set watchpoint has been triggered before one of the set breakpoints due to a write to the memory location. This can be done by a corresponding check when the watchpoint is triggered, for instance, or simply by deleting the watchpoint (if necessary automatically) when one of the breakpoints is triggered. The watchpoint can then only be triggered before one of the breakpoints is triggered.

According to various embodiments, the method can be carried out automatically by a test tool (i.e. test program) that is being executed on a test system, in particular a test tool used by or included in a fuzzing test program. The above method (and its various embodiments described here) can thus be carried out automatically (and repeatedly) as part of fuzz testing (carried out by a fuzzing test program).

The method of FIG. 2 can be carried out by one or more computers comprising one or more data processing units. The term "data processing unit" can be understood to mean any type of entity that enables the processing of data or signals. The data or signals can, for example, be processed according to at least one (i.e. one or more than one) specific function carried out by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination thereof. Any other way of implementing the respective functions described in more detail here can also be understood as a data processing unit or logic circuitry. One or more of the method steps described in detail here can be carried out (e.g. implemented) by a data processing unit by means of one or more specific functions executed by the data processing unit.

The approach of FIG. 2 is used to test a program, for example control software for a robot device. The term "robot device" can be understood to mean any technical system, such as a computer-controlled machine, a vehicle, a household appliance, a power tool, a manufacturing machine, a personal assistant or an access control system. The control software can also be used for data processing systems such as a navigation device.

The method of FIG. 2 is carried out by a test arrangement (e.g. the computer 100 and the target device 106 of FIG. 1), for instance.

Although specific embodiments have been illustrated and described here, those skilled in the art in the field will recognize that the specific embodiments shown and described may be exchanged for a variety of alternative and/or equivalent implementations without departing from the scope of protection of the present invention. This application is intended to cover any adaptations or variations of the specific embodiments discussed here.

What is claimed is:

1. A method for testing a computer program, comprising the following steps:
   executing the computer program until a subprogram of the computer program is called;
   ascertaining a memory location of a call stack in which a return address of the called subprogram or a stack base pointer of the called subprogram is stored;
   setting a watchpoint on the ascertained memory location;
   setting breakpoints on return instructions of the called subprogram;
   continuing the execution of the computer program; and
   indicating that the computer program has an error when the set watchpoint has been triggered before one of the set breakpoints is triggered due to a write to the memory location.

2. The method according to claim 1, wherein the ascertaining of the memory location includes stopping the execution of the computer program at an instruction for calling the subprogram, incrementally executing machine commands that implement the instruction for calling the subprogram until a machine command that stores the return address or the stack base pointer is reached, and ascertaining the memory location from the machine command.

3. The method according to claim 1, wherein the executing of the computer program is on an embedded system, and wherein the setting of the watchpoint and the setting of the breakpoints are via a test system connected to the embedded system.

4. The method according to claim 1, further comprising selecting a set of subprograms of the computer program, and, for each subprogram of the selected set, performing the executing step, the ascertaining step, the setting of the watchpoint step, the setting of the brakepoints step, the continuing step, and the indicating step.

5. The method according to claim 4, further comprising setting breakpoints on the subprograms of the selected set of subprograms.

6. The method according to claim 1, wherein the computer program is tested using fuzzing with a plurality of test cases, wherein each test case specifies a respective set of subprograms, and, for each subprogram, includes the respective set of programs specified for the test case, and wherein for each subprogram of each of the respective sets of subprograms, performing the executing step, the ascertaining step, the setting of the watchpoint step, the setting of the brakepoints step, the continuing step, and the indicating step.

7. The method according to claim 1, further comprising deleting the watchpoint when one of the set breakpoints is triggered.

8. The method according to claim 1, wherein the computer program is a control program for a robot device and the robot device is controlled with the computer program based on a result of testing the computer program.

9. A test arrangement configured to test a computer program, the test arrangement comprising:
   a computer; and
   a non-transitory computer-readable medium on which instructions are stored for testing a computer program, the instructions, when executed by the computer, causing the computer to perform the following steps including:
      executing the computer program until a subprogram of the computer program is called;
      ascertaining a memory location of a call stack in which a return address of the called subprogram or a stack base pointer of the called subprogram is stored;

setting a watchpoint on the ascertained memory location;

setting breakpoints on return instructions of the called subprogram;

continuing the execution of the computer program; and indicating that the computer program has an error when the set watchpoint has been triggered before one of the set breakpoints is triggered due to a write to the memory location.

10. A non-transitory computer-readable medium on which instructions are stored instructions for testing a computer program, the instructions, when executed by a processor, causing the prcessor to perform the following steps:

executing the computer program until a subprogram of the computer program is called; ascertaining a memory location of a call stack in which a return address of the called subprogram or a stack base pointer of the called subprogram is stored;

setting a watchpoint on the ascertained memory location;

setting breakpoints on return instructions of the called subprogram;

continuing the execution of the computer program; and indicating that the computer program has an error when the set watchpoint has been triggered before one of the set breakpoints is triggered due to a write to the memory location.

<p style="text-align:center">* * * * *</p>